(12) United States Patent
Bell

(10) Patent No.: US 9,841,096 B2
(45) Date of Patent: Dec. 12, 2017

(54) BELT PULLEY AND METHOD FOR PRODUCING IT

(71) Applicant: Schaeffler Technologies AG & Co. KG, Herzogenaurach (DE)

(72) Inventor: Lorenz Bell, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 188 days.

(21) Appl. No.: 14/775,028

(22) PCT Filed: Mar. 27, 2014

(86) PCT No.: PCT/DE2014/200143
§ 371 (c)(1),
(2) Date: Sep. 11, 2015

(87) PCT Pub. No.: WO2014/154218
PCT Pub. Date: Oct. 2, 2014

(65) Prior Publication Data
US 2016/0017979 A1    Jan. 21, 2016

(30) Foreign Application Priority Data
Mar. 28, 2013  (DE) .................. 10 2013 005 373

(51) Int. Cl.
*F16H 55/48* (2006.01)
*B29C 45/14* (2006.01)
(Continued)

(52) U.S. Cl.
CPC ......... *F16H 55/48* (2013.01); *B29C 45/1459* (2013.01); *B29C 45/2708* (2013.01);
(Continued)

(58) Field of Classification Search
CPC .............................. F16H 55/48; B29C 45/1459
(Continued)

(56) References Cited

U.S. PATENT DOCUMENTS 4,973,292 A * 11/1990 Mevissen ................ F16H 55/36
474/192
5,630,769 A * 5/1997 Schmidt .................... B60B 5/02
474/167
(Continued)

FOREIGN PATENT DOCUMENTS

DE       10360290       7/2005
EP        2175169       4/2010
(Continued)

*Primary Examiner* — William E Dondero
*Assistant Examiner* — Mark K Buse
(74) *Attorney, Agent, or Firm* — Volpe and Koenig, P.C.

(57) ABSTRACT

A belt pulley (1) for a belt drive and a plastic injection molding method for producing the belt pulley are provided. The belt pulley (1) includes an anti-friction bearing (2) and a running ring (3) which surrounds the bearing outer ring (7). An end side of the running ring has a multiplicity of molding points (13) which run on the sector radii (R) of circular sectors which have a common center point on the rotational axis (15) of the belt pulley and at least two center point angles (α) of different size. Part of the circular sectors are to have sector radii, on which the molding points have cross sections of different size. Here, the center point angle of the adjacent circular sector on the side of the larger molding cross section is larger than the center point angle of the adjacent circular sector on the side of the smaller molding cross section.

8 Claims, 3 Drawing Sheets

(51) Int. Cl.
*B29C 45/27* (2006.01)
*F16H 7/08* (2006.01)
*B29L 31/32* (2006.01)
*B29C 45/00* (2006.01)

(52) U.S. Cl.
CPC .. *B29C 45/0046* (2013.01); *B29C 2045/2709* (2013.01); *B29L 2031/32* (2013.01); *F16H 2007/0865* (2013.01)

(58) Field of Classification Search
USPC .......................................................... 474/199
See application file for complete search history.

(56) References Cited

U.S. PATENT DOCUMENTS

| | | | | |
|---|---|---|---|---|
| 8,167,750 | B2* | 5/2012 | Hamada | F16H 7/12 474/188 |
| 8,617,016 | B2* | 12/2013 | Dutil | F16H 55/36 474/166 |
| 9,416,863 | B2* | 8/2016 | Schaefer | F16H 55/48 |
| 2007/0108839 | A1* | 5/2007 | Sauer | B60B 5/02 305/136 |
| 2009/0191995 | A1* | 7/2009 | Hamada | F16H 7/12 474/94 |
| 2010/0184548 | A1* | 7/2010 | Langlois | B29C 45/0025 474/190 |
| 2011/0300979 | A1* | 12/2011 | Dutil | F16H 55/36 474/166 |
| 2012/0094796 | A1* | 4/2012 | Hamada | F16H 7/12 474/190 |

FOREIGN PATENT DOCUMENTS

| | | |
|---|---|---|
| JP | H0825501 | 1/1996 |
| JP | H09166199 | 6/1997 |
| JP | 2002292678 | 10/2002 |
| JP | 2011137517 | 7/2011 |

* cited by examiner

| Sector No. | D1 [mm] | D2 [mm] | α[°] | α (D$_{max}$)[°] | α (D$_{min}$)[°] |
|---|---|---|---|---|---|
| 1 | 1,4 | 1,4 | 14,5 | - | - |
| 2 | 1,4 | 2 | 39 | 39 | 14,5 |
| 3 | 2 | 2 | 39 | - | - |
| 4 | 2 | 1,4 | 39 | 39 | 14,5 |
| 5 | 1,4 | 1,4 | 14,5 | - | - |
| 6 | 1,4 | 1,4 | 39 | - | - |
| 7 | 1,4 | 1,4 | 14,5 | - | - |
| 8 | 1,4 | 1,4 | 39 | - | - |
| 9 | 1,4 | 1,4 | 14,5 | - | - |
| 10 | 1,4 | 1,6 | 39 | 29 | 14,5 |
| 11 | 1,6 | 1,6 | 29 | - | - |
| 12 | 1,6 | 1,4 | 39 | 29 | 14,5 |

BELT PULLEY AND METHOD FOR PRODUCING IT

BACKGROUND

The invention relates to a belt pulley for a belt drive and a plastic injection molding method for producing the belt pulley. The belt pulley comprises an anti-friction bearing and a plastic running ring that surrounds the anti-friction bearing and with which the outer ring of the anti-friction bearing is injection molded. One end side of the running ring has a plurality of molding points that run on the sector radii of circular sectors that have a common center point on the rotational axis of the belt pulley and at least two center point angles of different sizes.

Such belt pulleys are typically used in belt drives of internal combustion engines for tensioning or switching the belt. To keep the operating noises of the belt drive to the lowest possible level, it is known from DE 103 60 290 B4 to keep the vibrational excitation of the belt resulting from the out-of-roundness of the running ring small. This is possible through the special shaping for the plastic injection molding of the running ring and in reality through the positioning of the injection molding points that are distributed in non-uniform angular positions on the end side of the running ring. In this way, the out-of-roundness that is unavoidable in injection molding can be defined for the running ring and distributed sufficiently non-uniformly over the belt running surface. Through this detailed shaping, above all, the especially undesired resonance effects in the belt drive can be prevented.

The non-uniform angular distribution of the injection molding points, however, causes a filling progress that is non-uniform in time for the injection molding cavity with plastic melt, wherein the process-dependent increase in pressure produces non-round deformation of the anti-friction bearing outer ring at the end of the injection molding process and this deformation leads to the development of operating noises and premature failure of the anti-friction bearing.

SUMMARY

The invention is based on the objective of providing a belt pulley of the type named above with reduced deformation of the anti-friction bearing outer ring and a corresponding injection molding method for the production of such a belt pulley.

The solution to achieving this objective is given from the features of the device and method claim according to one or more features of the invention. Accordingly, a part of the circular sectors should have sector radii on which the injection molding points have different size cross sections, wherein the center point angle of the circular sector adjacent to the larger injection molding cross section is larger than the center angle of the circular sector adjacent to the smaller injection molding cross section. The non-uniform dimensioning of the injection molding cross sections generates locally different pressure losses in the injection molding system with correspondingly different flow velocities at the injection molding points. Here, the different flow path lengths from the injection molding points to these areas are compensated, so that the last filled areas of the injection molding cavity are reached essentially at the same time by the plastic melt.

Thus, the optimal unequal distribution of the injection molding points for the low vibrational excitation by the belt pulley is maintained and the previously resulting disadvantage of non-uniform deformation of the anti-friction bearing outer ring is compensated or ideally even eliminated by the non-uniform dimensioning of the injection molding cross sections according to the invention. This also applies for the case that the running ring is reinforced with fibers. In this case, the invention reduces or prevents the previous state in which fibers oriented in the pulley revolving direction with the plastic melt flow at the end of the filling process negatively affect the shrinkage behavior of the cooling plastic melt and in this way deform the anti-friction bearing outer ring.

BRIEF DESCRIPTION OF THE DRAWINGS

Additional features of the invention result from the following description and from the drawings in which an embodiment of a belt pulley according to the invention is shown for an auxiliary unit belt drive of an internal combustion engine. Shown are.

DETAILED DESCRIPTION OF THE PREFERRED EMBODIMENTS

Figure 1:
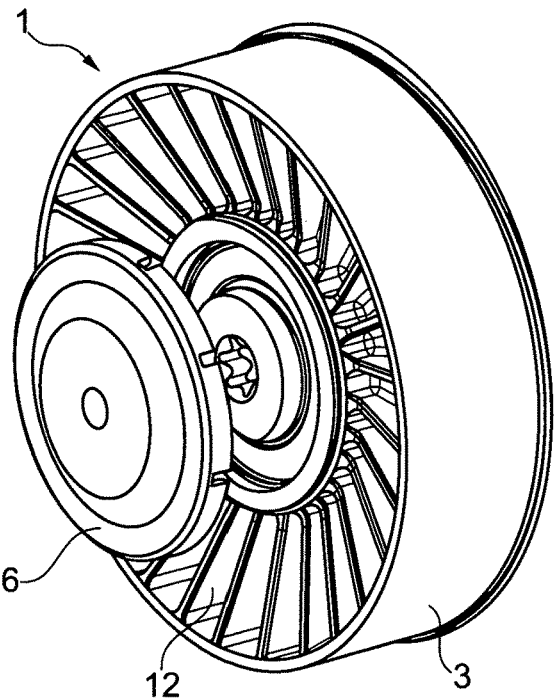
FIG. 1 the belt pulley in perspective view.
Figure 2:
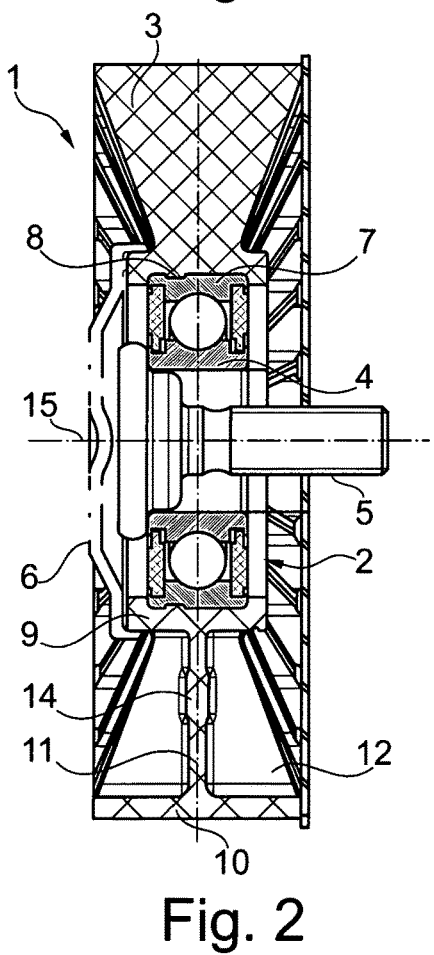
FIG. 2 the belt pulley in longitudinal section.
Figure 3:
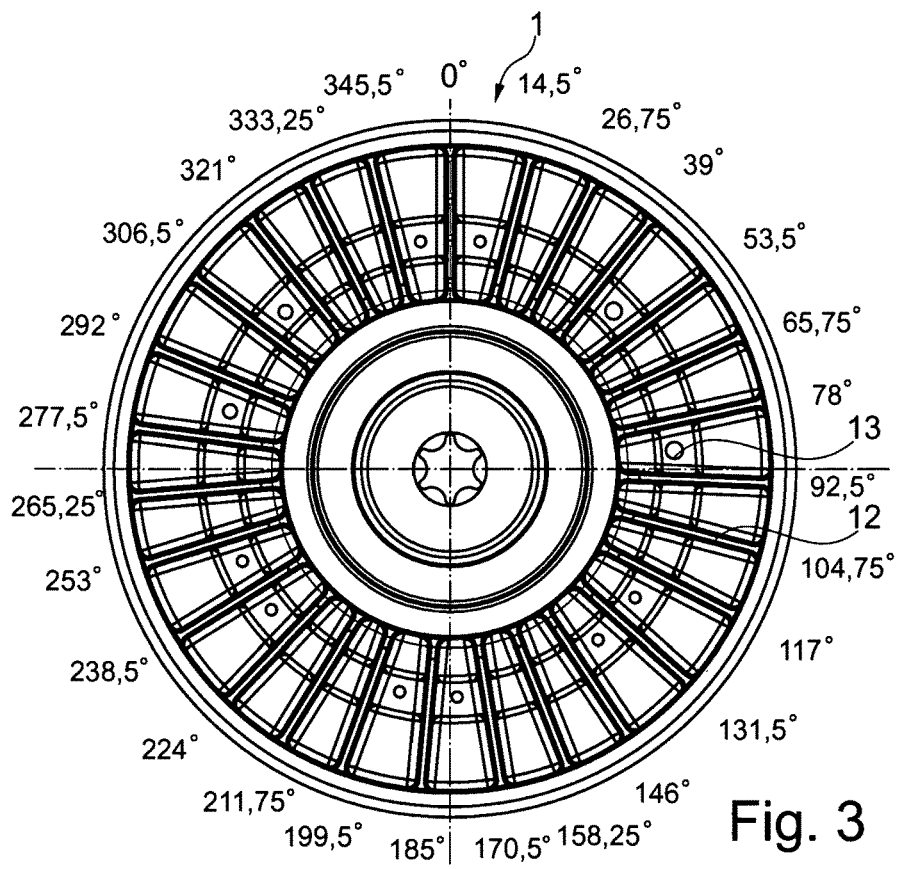
FIG. 3 the belt pulley in top view of the injection molding side.

The belt pulley 1 shown in FIGS. 1 to 3 comprises an anti-friction bearing 2 in the shape of a one-row ball bearing with seals on two sides, a running ring 3 made from plastic for a poly-V belt, a fastening screw 5 centered in the inner ring 4 of the ball bearing, and a cap 6 snapped onto the running ring for protecting the ball bearing from contaminating particles and spray water. The cap is only indicated in FIG. 2 and omitted in FIG. 3.

The running ring 3 made from polyamide PA66 with 25% glass-fiber reinforcement is produced by injection molding the running ring 3 onto the bearing outer ring 7. The running ring encloses the bearing outer ring on its cylindrical lateral surface and engages in a known way in the teeth of a surrounding groove 8. The running ring is assembled geometrically from an inner ring 9, an outer ring 10, a ring web 11 connecting the two rings, and an odd number of ribs 12 that support the outer ring against the inner ring. On each side of the ring web extend 27 ribs with non-uniform angular distribution in the radial direction. The injection molding of the running ring is realized at injection molding points 13 that run on an end side of the running ring with non-uniform angular distribution each centrally between two adjacent ribs on a ring bead 14 that rises on the ring web and is used as a flow aid for the plastic melt. The outer diameter of the running ring is 90 mm and the partial circular diameter on which the injection molding points are arranged is 61 mm.

Figure 4:
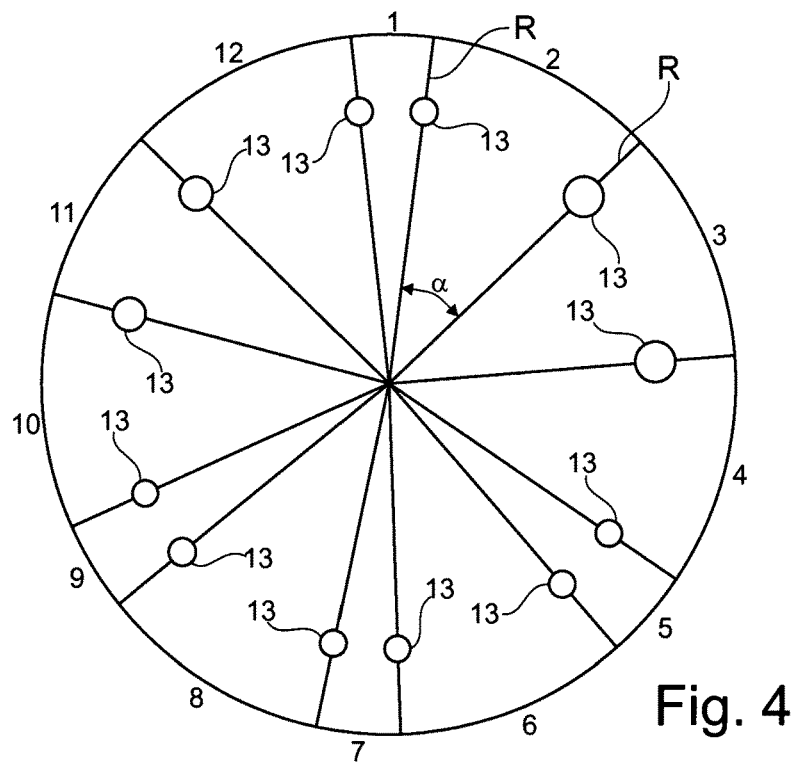
FIG. 4 the injection molding geometry of the running ring.
Figures 5, 6:
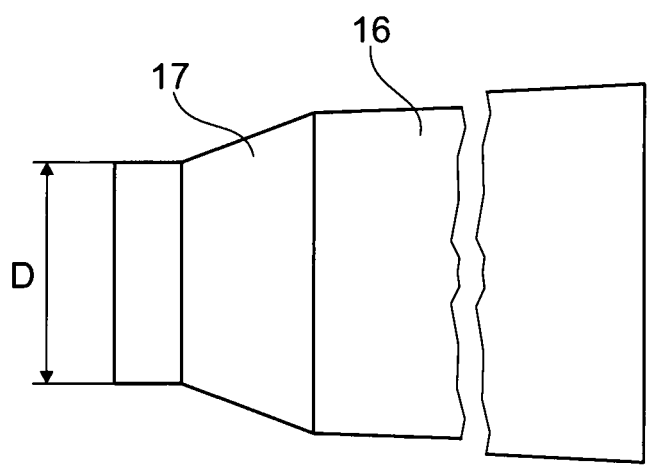
FIG. 5 the value table associated with the injection molding geometry.
FIG. 6 in schematic view, the feed channel of a cold runner of an injection molding machine.

FIG. 4 shows an injection molding geometry according to the invention for the running ring 3. The injection molding geometry is the result of a plastic injection molding simulation that has the objective of equalizing the progress of the filling of the circular ring-shaped injection molding cavity in terms of time with the plastic melt injected at the end. As explained above, such an equalized filling process reduces the out-of-roundness deformation of the bearing outer ring 7 due to the pressure increases caused by the process at the end of the filling process and, at the same time, also the undesired orientation of fibers in the pulley revolving direction, which also deforms the bearing outer ring. The simulation takes place by the process simulation program "Autodesk Moldflow," wherein the parameters of number, circumferential position, and cross section of the injection molding points 13, but not the circumferentially non-uniform arrangement of the ribs 12, would be changed, whose angles are given in the dimensioned FIG. 3. An injection molding geometry optimized for minimal deformation of the bearing outer ring is given in this rib arrangement with twelve injection molding points, whose diameters and circumferential distribution are given from FIG. 4 and from the value table according to FIG. 5.

Additional parameters of the simulation:
approx. 1.2 million elements, 1 mold cavity modeled
Filling time: 1.8 s
Profiled pressure increase: 12 s, 700/500 bar
Mold: 80° C., melt 295° C.

Geometrically, the injection molding points 13 run on the sector radii R of circular sectors no. 1 to no. 12, which have a common center point on the rotational axis 15 of the belt pulley 1 (see FIG. 2) and three different size center angles α with 14.5°, 29°, and 39°. A part of the circular sectors, namely sectors no. 2, no. 4, no. 10, and no. 12, has sector radii on which the injection molding points have different size cross sections. For example, for circular sector no. 2, the diameter D1 of one injection molding point is 1.4 mm and the diameter D2 of the other injection molding point is 2.0 mm. For this part of the circular sectors, it is now applicable that the center angle of one circular sector that runs on the neighboring side of the larger injection molding cross section is greater than the center angle of the other circular sector that runs on the neighboring side of the smaller injection molding cross section. For the circular sector no. 2 explained as an example, the center angle of the circular sector no. 3 adjacent on the side of the larger injection molding cross section with D2=2.0 mm is α(Dmax)=39°, and the center angle of the circular sector no. 1 adjacent on the side of the smaller injection molding cross section with D1=1.4 mm is α(Dmin)=14.5°. Expressed extremely simplified, this means that the injection molding point responsible for the filling of a larger angular region also has a correspondingly larger injection molding cross section. The parameter values of the different circular sectors are to be taken from the table accordingly.

As an alternative to the illustrated embodiment, it is also conceivable for the injection molding points to have a non-circular cross section and/or to divide their cross sections into multiple injection molding points for each sector radius R. The diameters D of circular injection molding points are advantageously between 0.8 mm and 2.4 mm.

The injection molding of the running ring 3 onto the bearing outer ring 7 with plastic takes place via a cold runner with a plurality of feed channels that are arranged on the ends of the cavity adjacent to the running ring 3 corresponding to the circumferential distribution of the injection molding points 13. As shown schematically in FIG. 6, the cross sections and thus the volumes of the feed channels 16 up to a transition cone 17 are identical, wherein the cone angle of each transition cone is dimensioned so that the cross section of the feed channel is reduced to the respective cross section or diameter D of the injection molding point (gate cross section).

REFERENCE NUMBERS

1 Belt pulley
2 Anti-friction bearing
3 Running ring
4 Bearing inner ring
5 Fastening screw
6 Cap
7 Bearing outer ring
8 Groove
9 Inner ring
10 Outer ring
11 Ring web
12 Rib
13 Injection molding point
14 Ring bead
15 Rotational axis
16 Feed channel
17 Transition cone

The invention claimed is:

1. A method for producing a belt pulley for a belt drive comprising:
   providing an anti-friction bearing with an outer ring; and
   injection molding a plastic running ring onto the outer ring by end-side injection molding via a plurality of feed channels;
   wherein one end of the running ring has a plurality of injection molding points that are each located on sector radii (R) of circular sectors that have a common center point on a rotational axis of the belt pulley and at least two different size center angles (α);
   a part of each of the circular sectors include the sector radii (R) on which the injection molding points are located and the injection molding points each have different size cross sections; and
   the center angle (α) of an adjacent one of the circular sectors on a side of a larger injection molding point cross section is greater than a center angle (α) of an adjacent circular sector on a side of a smaller injection molding point cross section.

2. The method according to claim 1, wherein the running ring has an inner ring, an outer ring, and a ring web connecting the inner ring to the outer ring, and on both sides of the ring web, a plurality of ribs that extend radially with non-uniform angular distribution and support the outer ring against the inner ring, and the injection molding points each are arranged between two of the ribs on a ring bead rising from the ring web.

3. The method according to claim 2, wherein a number of the ribs is odd.

4. The method according to claim 1, wherein the injection molding points are circular and have different diameters (D) between 0.8 mm and 2.4 mm.

5. A method for producing a belt pulley for a belt drive comprising:
   providing an anti-friction bearing with an outer ring; and
   injection molding a plastic running ring onto the outer ring by end-side injection molding via a plurality of feed channels at a plurality of injection molding points that are each located on sector radii (R) of circular sectors of the running ring that have a common center point;
   wherein the plurality of injection molding points include different size cross sections and a center angle (α) of an adjacent one of the circular sectors on a side of a larger injection molding point cross section is greater than a center angle ($\alpha$) of an adjacent circular sector on a side of a smaller injection molding point cross section.

6. The method according to claim 5, wherein the running ring has an inner ring, an outer ring, and a ring web connecting the inner ring to the outer ring, and on both sides of the ring web, a plurality of ribs that extend radially with non-uniform angular distribution and support the outer ring against the inner ring, and the injection molding points each are arranged between two of the ribs on a ring bead rising from the ring web.

7. The method according to claim 6, wherein a number of the ribs is odd.

8. The method according to claim 5, wherein the injection molding points are circular and have different diameters (D) between 0.8 mm and 2.4 mm.

* * * * *